United States Patent [19]
Ogihara et al.

[11] Patent Number: 5,060,000
[45] Date of Patent: * Oct. 22, 1991

[54] MOTOR-DRIVEN SHUTTER FOR CAMERA

[75] Inventors: Masuo Ogihara; Hiroyuki Ishida; Shinji Nagaoka; Youichi Seki; Shigeru Tagami; Hiroshi Yamazaki; Nobuo Shinozaki, all of Yotsukaido, Japan

[73] Assignee: Seikosha Co., Ltd., Japan

[ * ] Notice: The portion of the term of this patent subsequent to Nov. 14, 2006 has been disclaimed.

[21] Appl. No.: 427,037

[22] Filed: Oct. 25, 1989

Related U.S. Application Data

[63] Continuation of Ser. No. 15,169, Feb. 17, 1987, Pat. No. 4,881,096.

[51] Int. Cl.$^5$ ............ G03B 3/10; G03B 7/00; G03B 9/22
[52] U.S. Cl. .................... 354/400; 354/439; 354/234.1
[58] Field of Search ............ 354/400, 402, 403, 404, 354/405, 408, 195.1, 234.1, 435, 439, 195.12

[56] References Cited

U.S. PATENT DOCUMENTS

| | | | |
|---|---|---|---|
| 3,274,914 | 9/1966 | Biedermann et al. | 354/408 X |
| 4,324,463 | 4/1982 | Lermann et al. | 354/408 |
| 4,336,988 | 6/1982 | Johnson | 354/195.12 |
| 4,508,442 | 4/1985 | Hirohata | 354/400 |
| 4,610,523 | 9/1986 | Tsuboi | 354/195.1 |
| 4,634,254 | 1/1987 | Ogihara et al. | 354/403 |
| 4,684,233 | 8/1987 | Kodaira et al. | 354/400 |
| 4,696,559 | 9/1987 | Kondo | 354/195.1 X |
| 4,728,979 | 3/1988 | Akitake et al. | 354/400 |
| 4,779,114 | 10/1988 | Kobayashi | 354/400 |

Primary Examiner—W. B. Perkey
Attorney, Agent, or Firm—Bruce L. Adams; Van C. Wilks

[57] ABSTRACT

A drive ring drivable by a stepping motor is normally urged by a spring to turn in one direction around a lens aperture. When not in use, the stepping motor is not subjected to the resilient force from the spring since the drive ring is locked against rotation by a ratchet wheel engaged by an engagement lever. The stepping motor is therefore not subjected to undue stresses and is prevented from malfunctioning. Consequently, focusing failures and exposure adjustment failures which could otherwise arise from malfunctioning of the stepping motor are prevented from occurring. In operation, a solenoid is energized to move the engagement lever out of engagement with the ratchet wheel, which is then freed to allow the drive ring to be turned by the stepping motor.

7 Claims, 3 Drawing Sheets

MOTOR-DRIVEN SHUTTER FOR CAMERA

This is a continuation of application Ser. No. 015,169, filed Feb. 17, 1987, now U.S. Pat. No. 4,881,096.

BACKGROUND OF THE INVENTION

1. Field of the invention

The present invention relates to a motor-driven shutter for use in a camera with automatic focusing and exposure control.

2. Description of the Prior Art

Japanese Laid-Open Patent Publication No. 61-9631 discloses a shutter which, in combination with a single stepping motor is capable of continuously effecting a focusing operation, exposing operation an according to the brightness an object to be photographed, and a returning operation. According to the disclosed shutter device, a range adjustment lever which is biased by a spring is held in abutment against a drive lever that is arrested and driven by the stepping motor, and the range adjustment lever is engaged in a focused position for thereby setting the objective lens in the focused position.

With this arrangement, the resilient force of the spring acting on the range adjustment lever is applied via the drive lever to the stepping motor When the stepping motor is not in use, the motor has to hold the drive lever and other members in a standby position while resisting the spring force under the magnetic coupling force of the rotor and stator of the motor. In the event that the camera is subjected to a shock, the spring force and the magnetic coupling force are brought out of balance, shifting the stator and the rotor out of phase with each other, so that the shutter will not operate properly.

SUMMARY OF THE INVENTION

In view of the aforesaid drawbacks of the conventional shutter device, it is an object of the present invention to provide a motor-driven shutter for use in cameras and which is capable of releasably engaging or locking a range adjustment means without imposing any load on a motor means, for thereby preventing various problems from occurring due to a failure or malfunction of the motor means According to the present invention, there is provided a motor-driven shutter for use in a camera, including a drive member drivable by a motor means, a range adjustment means normally urged by a resilient member for movement with the drive member, a focus detecting means operable in coaction with the range adjustment means for producing a focusing signal, and a solenoid means deenergized in response to the focusing signal from the focusing detecting means for locking the range adjustment means in a focused position. The range adjustment means includes a locking member lockable by the solenoid means in a standby position and a retracting member for unlocking the locking member to allow the solenoid means to lock the range adjustment means in the focused position when the shutter starts to operate.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
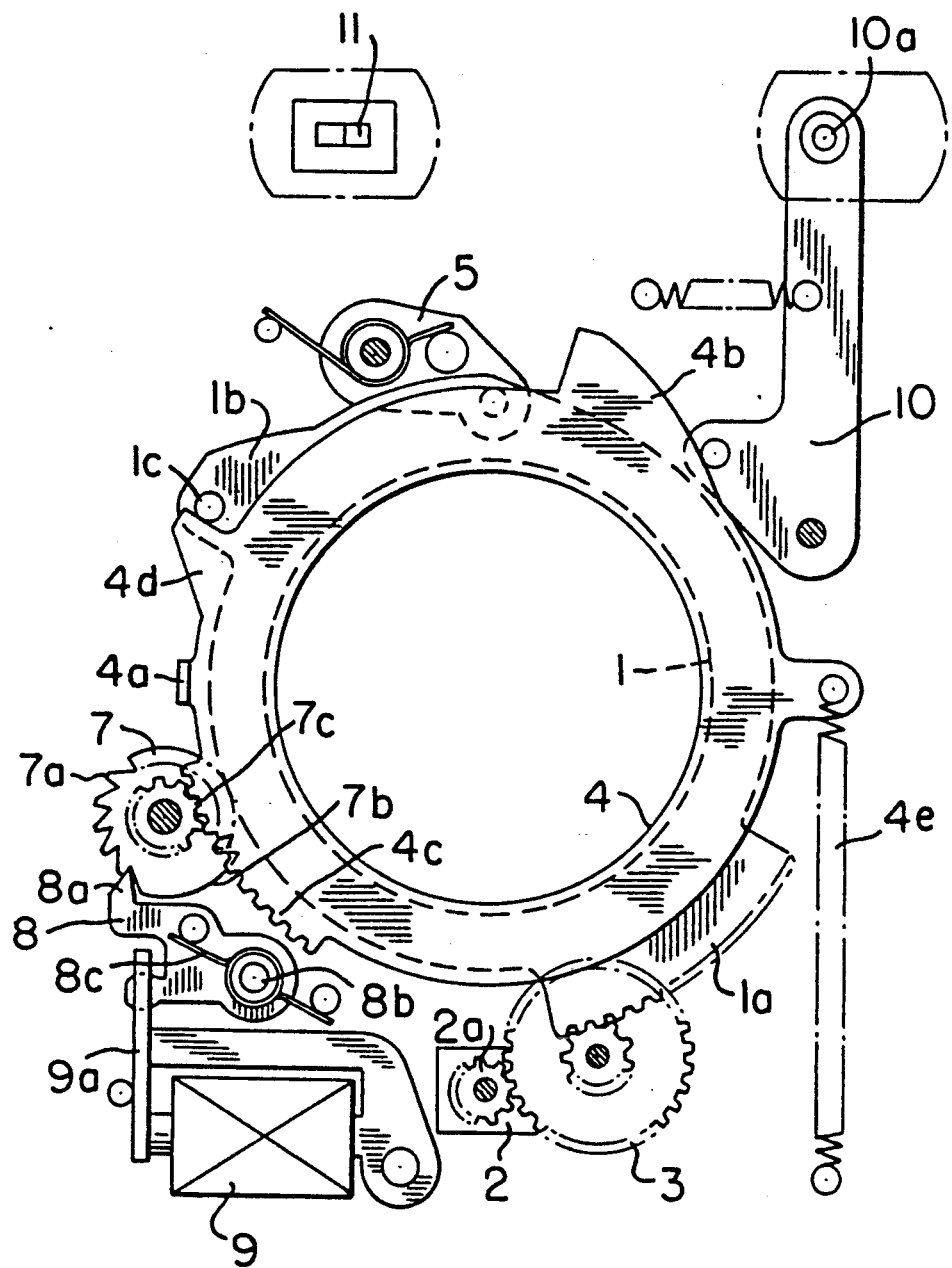
FIG. 1 is a front elevational view of a solenoid-operated shutter according to the present invention.
Figure 3:
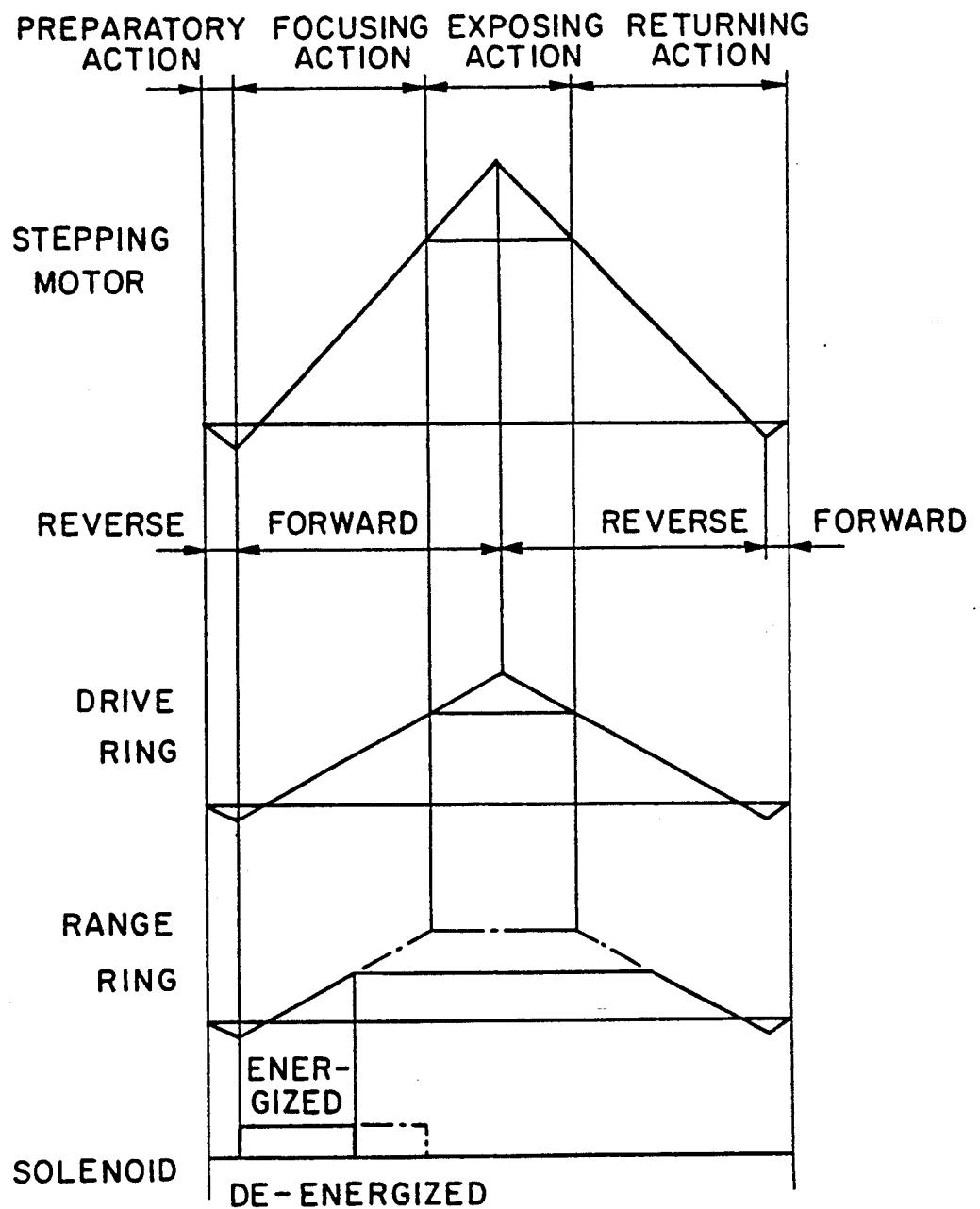
FIG. 3 is a timing chart of operation of various components of the shutter.

FIG. 1 shows a solenoid-operated shutter according to the present invention, the parts of the shutter being positioned before the shutter is released. A drive ring 1 is angularly movable around a lens aperture and has a sector gear 1a on its outer circumferential edge. The drive ring 1 is driven by a rotor gear 2a mounted on the shaft of a stepping motor 2 and meshing with an idler 3 which meshes with the sector gear 1a. The drive ring 1 is rotated around the lens aperture selectively in opposite directions when the stepping motor 2 is reversed for preparatory action and rotated in forward and reverse directions for focusing, exposing, and returning action 3 (FIG. 3). The drive ring 1 also has a sector opening/closing cam 1b projecting radially outwardly from the circumferential edge thereof for opening and closing a shutter sector (not shown) by acting on a shutter sector opening/closing lever 5 when a focused region is exceeded.

A range ring 4 is also disposed in concentric relation to the drive ring 1 for angular movement around the lens aperture to cause a lens driver 4a to move a lens (not shown) into a focused position. The range ring 4 has a cam 4b for scanning a light-emitting element and a sector gear 4c meshing with a pinion 7c on a ratchet wheel 7 (described later). The range ring 4 is normally urged by a spring 4e to tun clockwise (FIG. 1) to cause a projection 4d to engage with a pin 1c on the drive ring 1 to thereby interlock the range ring 4 for angular movement with the drive ring 1.

The ratchet wheel 7 and the range ring 4 jointly constitute a range adjustment means. The ratchet wheel 7 serving as a locking member has a plurality of teeth 7a on its outer circumferential edge for determining the focused position. The ratchet wheel 7 also has a tooth-free larger-diameter sector 7b positioned as a retracting or unlocking member circumferentially adjacent to the first tooth 7a for retracting a finger 8a of an engagement lever 8 into a non-engaging position in response to initial reverse angular movement of the range ring 4.

The engagement lever 8 is angularly movably supported on a pin 8b on the base plate and normally urged by a spring 8c to turn clockwise about the pin 8b. The engagement lever 8 is coupled to an iron piece 9a which is magnetically attractable to a solenoid or electromagnet 9 when it is energized. When the solenoid 9 is deenergized, the engagement lever 8 is turned clockwise under the resiliency of the spring 8c to bring the finger 8a into adjacent two of the teeth 7a of the ratchet wheel 7 for thereby holding the ratchet wheel 7 and thus the range ring 4 in the focused position.

A lever 10 is guided by the cam 4b of the range ring 4 for angular movement for scanning the light-emitting element, designated at 10a, mounted on the distal end of the lever 10. A two-component sensor 11 receives a pulse of light emitted by the light-emitting element 10a and reflected by an object to be photographed and, when output levels from the two sensor areas of the sensor 11 are equalized, produces a focusing signal to de-energize the solenoid 9.

Operation of the solenoid-operated shutter thus constructed will be described below.

Before the shutter is released as shown in FIG. 1, the solenoid 9 is deenergized an the engagement lever 8 is biased by the spring 8c to turn clockwise to bring the finger 8a into engagement with the first tooth 7a of the ratchet wheel 7, thereby keeping the range ring 4 from rotation. Thus, the drive ring 1 is not subjected to the resilient force of the spring 4e through the range ring 4, and hence the rotor and stator of the stepping motor 2 properly remain magnetically coupled.

Figure 2A:
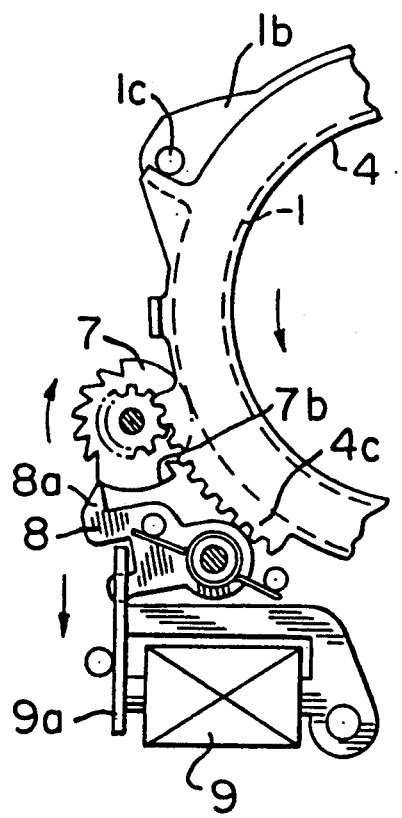
FIGS. 2(a) and 2(b) are fragmentary front elevational views showing operation of the solenoid-operated shutter.

In response to depression of a shutter release button, a main switch is turned on to rotate the stepping motor 2 in the reverse or counterclockwise direction for preparatory action (FIG. 3). The drive ring 1 and the range ring 4 are now rotated counterclockwise (FIG. 1), whereupon the ratchet wheel 7 in mesh with the range ring 4 is turned clockwise to force the finger 8a of the engagement lever 8 out of engagement with the tooth 8a and onto he outer circumference of the tooth-free larger-diameter sector 7b (FIG. 2(a)).

Figure 2B:
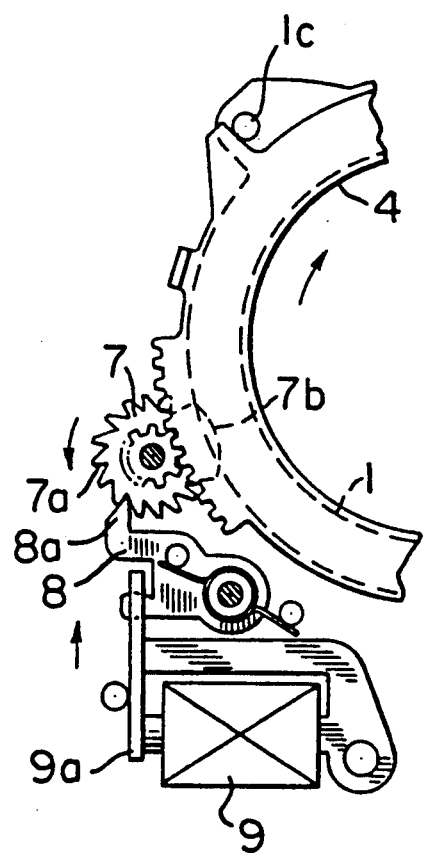

The above preparatory action is followed by rotation of the stepping motor 2 in the forward or clockwise direction for focusing action. At the same time, the solenoid 9 is energized to attract the iron piece 9a, thereby holding the engagement lever 8 at the tooth-free large-diameter sector 7b of the ratchet wheel 7. As the range ring 4 is angularly moved clockwise, the scanning lever 10 starts its clockwise angular movement by being guided by the cam 4b, allowing a pulse of light from the light-emitting element 10a to be applied to the object. The two-component sensor 11 then detects reflected light from the object When outputs from the two sensor areas of the sensor 11 coincide with each other, the sensor 11 generates a focusing signal to display range information in a viewfinder (not shown) and to de-energize the solenoid 9. The engagement lever 8 is now turned clockwise under the force of the spring 8c into engagement with the ratchet wheel 7, which then stops the range ring 4 to position the objective lens in the focused position (FIG. 2(b)).

Continued forward rotation of the stepping motor 2 causes the drive ring 1 to turn clockwise after the lens has been focused, thereby enabling the sector opening/closing cam 1b to turn the sector opening/closing lever 5 counterclockwise for opening the shutter sector (not shown).

When a number of motor driving pulses as calculated according to the detected object brightness are produced, a control circuit (not shown) reverses the phase of the driving pulses. After the sector has been opened to the degree dependent on the object brightness, the control circuit reverses the stepping motor 2 (FIG. 3) to return the drive ring 1 counterclockwise (FIG. 1) while closing the sector until the parts are moved back to the initial position of FIG. 1.

In the illustrated embodiment, the stepping motor 2 is reversed slightly excessively and then rotated forwardly in the returning action (FIG. 3) for return to the standby position. The ratchet wheel 7 is therefore rotated slightly excessively clockwise by the drive ring 1 and the range ring 4 to move the finger 8a of the engagement lever 8 from the teeth 7a onto the tooth-free larger-diameter sector 7b, and then is rotated counterclockwise to bring the finger 8a into engagement with the first tooth 7a, thus accurately positioning the range ring 4.

While the ratchet wheel 7 meshing with the range ring 4 has the larger-diameter sector 7b for retracting the engagement lever 8, the range ring 4 may be provided with such a larger-diameter sector and teeth instead.

Therefore, when the camera is not in use, the stepping motor 2 is not subjected to the resilient force from the spring 4e since the drive ring 1 is locked against rotation by the ratchet wheel 7 engaged by the engagement lever 8. The stepping motor 2 is thus not subjected to undue stresses and is prevented from malfunctioning. Consequently, focusing failures and exposure adjustment failures which would otherwise arise from malfunctioning of the stepping motor are prevented from occurring.

Although a certain preferred embodiment has been shown and described, it should be understood that many changes and modifications may be made therein without departing from the scope of the appended claims.

What is claimed is:

1. In a camera shutter: range adjustment means displaceable to an in-focus position for adjusting the range of the camera to an in-focus condition; locking means normally engageable with the range adjustment means to prevent displacement thereof and disengageable from the range adjustment means to permit displacement thereof to the in-focus position and thereafter engageable with the range adjustment means to releasably lock the same in the in-focus position; means including a solenoid operative when energized for effecting disengagement of the locking means from the range adjustment means; and electromagnetic driving means for effecting displacement of the range adjustment means to the in-focus position during energization of the solenoid.

2. A camera shutter according to claim 1; wherein the range adjustment means comprises a displaceable member having teeth thereon, and a rotary toothed member having a first tooth portion engageable with the teeth of the displaceable member whereby displacement of the displaceable member effects rotation of the tooth member and having a second tooth portion engageable with the locking means.

3. A camera shutter according to claim 1; including a displaceable drive member connected to be displaced in forward and reverse directions by the electromagnetic driving means, the range adjustment means being mounted to undergo displacement with the drive member and being urged by a spring to undergo displacement in one direction with the drive member.

4. In a camera shutter: a displaceable range adjustment member having teeth thereon and being displaceable to an in-focus position for adjusting the range of the camera to an in-focus condition; a rotary toothed member having a first tooth portion engageable with the teeth of the range adjustment member and having a second tooth portion; locking means disengageable from the second tooth portion of the toothed member to thereby permit displacement of the range adjustment member to the in-focus position accompanied by rotation of the toothed member and thereafter engageable with the second tooth portion of the toothed member to thereby releasably lock the range adjustment member in the in-focus position; means including a solenoid operative when energized for effecting disengagement of the locking means from the second tooth portion of the toothed member; and electromagnetic driving means for effecting displacement of the range adjustment member to the in-focus position during energization of the solenoid.

5. A camera shutter according to claim 4; including a displaceable drive member connected to be displaced in forward and reverse directions by the electromagnetic driving means, the range adjustment member being mounted to undergo displacement with the drive member and being urged by a spring to undergo displacement in one direction with the drive member.

6. A camera shutter according to claim 4; wherein the drive member has means thereon for actuating a shutter sector in the shutter opening direction.

7. A camera shutter according to claim 4; wherein the electromagnetic driving means comprises a bidirectional stepping motor.

* * * * *